United States Patent [19]

Wagensonner

[11] Patent Number: 4,729,015

[45] Date of Patent: Mar. 1, 1988

[54] METHOD AND APPARATUS FOR MAKING POSITIVE COPIES FROM DIAPOSITIVES

[75] Inventor: Eduard Wagensonner, Aschheim, Fed. Rep. of Germany

[73] Assignee: Agfa Gevaert Aktiengesellschaft, Leverkusen, Fed. Rep. of Germany

[21] Appl. No.: 883,624

[22] Filed: Jul. 9, 1986

[30] Foreign Application Priority Data

Jul. 19, 1985 [DE] Fed. Rep. of Germany ....... 3525807

[51] Int. Cl.⁴ .............................................. H04N 1/46
[52] U.S. Cl. ..................................... 358/76; 358/214; 358/78
[58] Field of Search ....................... 358/76, 41, 75, 78, 358/214, 215

[56] References Cited

U.S. PATENT DOCUMENTS

| | | | |
|---|---|---|---|
| 4,349,835 | 9/1982 | Horiguchi et al. | 358/76 |
| 4,368,484 | 1/1983 | Stemme | 358/41 |
| 4,393,398 | 7/1983 | Horiguchi et al. | 358/76 |

FOREIGN PATENT DOCUMENTS 1268657 12/1968 Fed. Rep. of Germany.

*Primary Examiner*—Michael A. Masinick
*Attorney, Agent, or Firm*—Peter K. Kontler; Tobias Lewenstein

[57] ABSTRACT

Diapositives are copied on negative photosensitive paper in an apparatus wherein the positive is electronically scanned, line-by-line, and the thus obtained density signals are electronically inverted prior to influencing the beam of a CRT or laser which is used to reproduce the image of the positive on paper, either line-by-line or point-by-point. The inversion of signals renders it possible to scan the high-transmissivity portions of the positives with a narrow beam, i.e., with a high degree of resolution.

17 Claims, 1 Drawing Figure

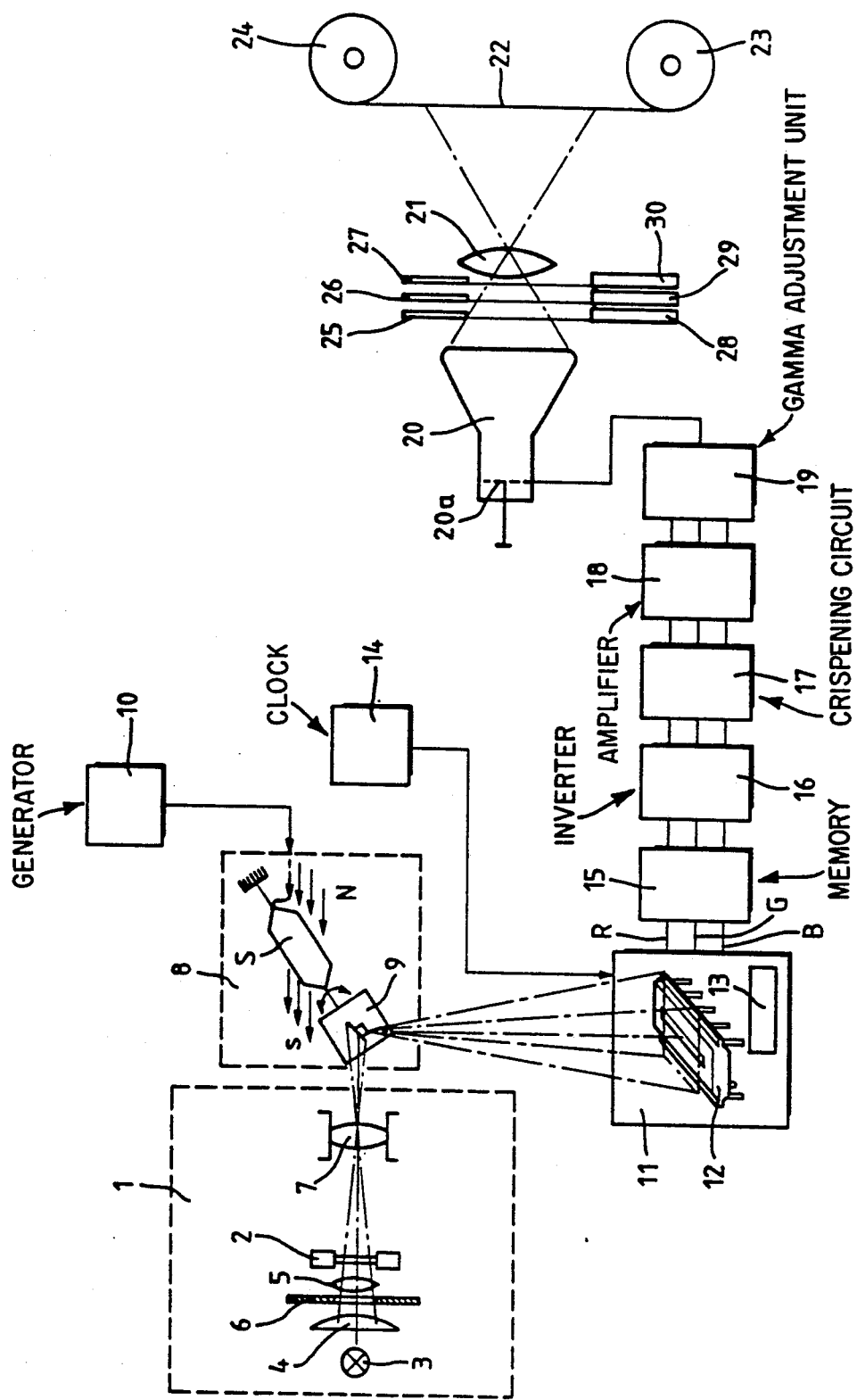

METHOD AND APPARATUS FOR MAKING POSITIVE COPIES FROM DIAPOSITIVES

CROSS-REFERENCE TO RELATED CASE

The method and apparatus of the present invention constitute improvements over and further developments of the method and apparatus disclosed in the commonly owned copending patent application Ser. No. 797,246 filed Nov. 12, 1985 for "Method, arrangement and material for point-by-point reproduction of an original". The disclosure of the copending application is incorporated herein by reference.

BACKGROUND OF THE INVENTION

The invention relates to a method of and to an apparatus for copying originals, especially diapositives. More particularly, the invention relates to improvements in methods of and in apparatus for making reproductions of originals which are scanned, line-by-line, by photoelectronic means and whose images are reproduced onto photo-sensitive material, line-by-line or point-by-point.

Electronic scanning and reproducing techniques of the above outlined character are gaining in importance in spite of the fact that copying times are longer than those in accordance with conventional integral exposure techniques. The reason is that methods and apparatus which rely on line-by-line scanning of originals and on line-by-line or point-by-point reproduction render it possible to influence the copies, e.g., by electronically improving the image and/or by effecting a partial color correction. Reference may be had, for example, to German Offenlegungsschrift No. 30 04 717.

As a rule, the images of negative originals are reproduced on negative copying material, and the images of diapositives are reproduced on color reversal material, i.e., a material which becomes practically white in response to impingement of a large quantity of copying light but remains black in regions which are not exposed to copying light. Thus, low-density portions of the original must be scanned with large quantities of light, i.e., with light of high intensity. This creates problems in connection with radiation which is supplied by a CRT or a laser because beams which issue from such sources do not have a uniform intensity across the entire cross-sectional area but rather a substantially Gaussian intensity distribution. The diameter of the beam increases in response to increasing intensity to bring about a darkening or brightening, depending on the nature of the copying paper.

Extensive tests indicate that medium- and low-density areas prevail in a great majority of originals irrespective of the motif or theme, and that such areas contribute primarily or largely to the composition of the image. Thus, conventional techniques involve a reproduction of the most important portions of diapositives by a beam of high intensity and relatively large diameter, i.e., the resolution of the corresponding portions of the copy is less satisfactory than that of copy portions exhibiting a pronounced density. Consequently, when the image of a diapositive is reproduced on reversal material, either point-by-point or line-by-line, the subjective quality of the images is less satisfactory than that of images which are obtained with the same equipment as a result of reproduction of negative originals on negative photosensitive material.

OBJECTS AND SUMMARY OF THE INVENTION

An object of the invention is to provide a novel and improved method which renders it possible to copy positive originals, line-by-line, and to produce copies which are just as satisfactory as those of the negative originals.

Another object of the invention is to provide a novel and improved apparatus for the practice of the above outlined method.

A further object of the invention is to provide novel and improved means for influencing the beam or beams of radiation which issue from a cathode ray tube or a laser and are used to reproduce the image of an original on photosensitive material.

An additional object of the invention is to provide an apparatus which can be designed to influence the quality of copies as a function of a number of different parameters.

Another object of the invention is to provide a novel and improved method of reproducing the images of diapositives on negative photographic paper.

The method of the present invention is used to make a copy of an original, particularly a positive copy of a diapositive. The method comprises the steps of photoelectrically scanning the original, line by line, to obtain density signals (this step can be carried out with a so-called swing mirror system), electronically inverting the density signals, and using the inverted density signals to influence a beam of radiation which is directed against a negative photosensitive material by a cathode ray tube or a laser and is used to expose the negative material, line-by-line or point-by-point.

The method can further comprise the step of storing at least some of the density signals prior to the influencing step, preferably prior to the inverting step.

The method preferably includes modifying the inverted signals prior to the influencing step so as to prevent pronounced widening (i.e., a pronounced increase of the diameter) of the beam in response to inverted signals which are generated as a result of scanning low- or medium-density portions of the original. The influencing step then includes selecting the intensity of the beam and the duration of impingement of the beam upon the negative material.

The apparatus of the present invention is used to make copies of originals, particularly positive copies of diapositives on negative photo-sensitive material. The apparatus comprises means (such as the aforementioned swing mirror system with appurtenant generator means and an associated CCD device or the like) for photoelectrically scanning the original, line-by-line, to obtain density signals, means for electronically inverting the density signals, a CRT or a laser for directing a beam of radiation upon negative photosensitive material, and means for influencing the beam in accordance with the characteristics of the inverted signals. The directing means is preferably designed to emit a beam having an intensity whose profile decreases outwardly from the center of the beam, preferably a beam with an approximately Gaussian intensity distribution.

The apparatus preferably comprises means for directing a beam of light containing the basic colors red, green and blue, and mobile red, green and blue color filters as well as electromagnets or other suitable means for moving the filters seriatim across the path of the light between the source of light and the negative photosensitive material.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a circuit diagram illustrating one presently preferred embodiment of the improved copying apparatus.

DESCRIPTION OF THE PREFERRED EMBODIMENTS

The drawing shows an apparatus which serves to reproduce the images of originals 2, particularly diapositives, onto negative photosensitive sheet material 22, such as a strip of negative photographic paper which is intermittently unwound from a supply reel 23 and is intermittently collected by a takeup reel 24. The character 1 denotes a support or platform for the diapositive 2 as well as for a radiation source 3, two condenser lenses 4, 5 which flank an adjustable diaphragm 6 between the radiation source 3 and the diapositive 2, and an objective lens 7 which is disposed between the diapositive 2 and a line-by-line scanning unit here shown as a so-called swing mirror system 8 having a loop oscillator S, which is periodically driven by a generator 10, and a pivotable mirror 9. The latter serves to deflect the radiation issuing from the source 3 and passing through the diapositive 2 against the array 12 of photodiodes in a charge-coupled device 11 (hereinafter CCD device). The CCD device 11 further comprises a shift register 13 which is connected with a clock pulse generator 14 in a manner identical with or analogous to that disclosed in commonly owned U.S. Pat. No. 4,368,484 granted Jan. 11, 1983 to Stemme et al. The disclosure of this patent (which further discloses a suitable swing mirror system) is incorporated herein by reference. A CCD device which can be used in the apparatus of the present invention is manufactured by the Fairchild Corporation.

The outputs R (red signals), G (green signals) and B (blue signals) of the CCD device 11 are connected with a memory 15 serving to store signals which are generated during scanning of one or more lines of the diapositive 2 (preferably all of the signals which are generated during line-by-line scanning of an original so as to ensure an optimal image processing). The outputs of the memory 15 are connected with a phase reversing or inverting circuit 16. The outputs of the circuit 16 are connected with the inputs of a crispening circuit 17 of the type disclosed in the patent to Stemme et al. or in German Pat. No. 1,268,657. The circuit 16 inverts each of the red, green and blue signals so that its outputs transmit sequences of negative signals whose flanks are made steeper in the crispening circuit 17. The purpose of the circuit 17 is to enhance the borderlines by processing each of the input signals to generate a correction signal which is added to the respective output signal to thus steepen the flanks of the output signal.

The crispening circuit 17 is followed by an amplifier stage 18 whose amplifiers amplify the incoming signals in accordance with the requirements of the components receiving signals from the crispening circuit 17. Such components include a gamma-adjustment unit 19 of the type disclosed, for example, in the commonly owned copending patent application Ser. No. 797,246 of Wagensonner. The purpose of the gamma adjustment unit 19 is to linearize the grey value of a cathode ray tube 20, e.g., a video display tube No. 634 produced by Tectronix, Inc. of Beaverton, Oreg. The tube 20 contains a single grid 20a or a discrete grid for each of the colors red, green and blue. The grid or grids 20a determine the brightness of the respective color signals on the screen of the tube 20. The image appearing on the screen of the tube 20 is focussed by an objective 21 onto that portion of the strip of photographic paper 22 which extends between the reels 23 and 24. The manner in which the reels 23, 24 are started upon completed imaging of a diapositive 2 onto the paper 22 is known and is not specifically shown in the drawing.

The apparatus further comprises three mobile color filters 25, 26, 27 for the additive colors red, green and blue which are disposed between the screen of the tube 20 and the objective 21 and are movable into and out of the path of radiation issuing from the screen by discrete electromagnets 28, 29 and 30, respectively.

The mode of operation of the aforedescribed apparatus is as follows:

The objective lens 7 and the swing mirror system 8 image the diapositive 2, line-by-line, onto the array 12 of the CCD device 11. The generator 10 drives the loop oscillator S with a periodicity which is large as compared with the periodicity of a video image and with the scanning cycles of the array 12.

The array 12 comprises three neighboring rows of photodiodes with the diodes of one row sensitized for the color red, the diodes of another row sensitized for the color green and the diodes of the third row sensitized for the color blue. The outputs R, G and B receive the respective signals from the shift register 13 and transmit such signals to the corresponding inputs of the memory 15.

The illustrated CCD device 11 can be replaced with a simplified device which has a single row of photodiodes and operates with three mobile color filters to transmit to the memory 15 seriatim three sets of signals for each line of the image on the diapositive 2.

The circuit 16 inverts the positive signals into negative signals, and the crispening circuit 17 modifies the inverted signals in the aforedescribed manner. Negative signals which are transmitted by the outputs of the crispening circuit 17 are amplified by the amplifier stage 18 and are modified in the gamma adjustment circuit 19 so as to conform to the characteristics of the tube 20 and to the sensitivity of the negative paper 22. If the electromagnet 28 is actuated to move the respective red filter 25 into the path of radiation issuing from the screen of the tube 20, the grid 20a is activated in accordance with the inverted red signals and the negative red image is depicted on the paper 22. The filter 25 is thereupon replaced by the green filter 26 and the information which was stored in the memory 15 is imaged onto the same part of the paper 22 between the reels 23, 24. The same procedure is then carried out with the blue filter 27. The resulting image is stored on the takeup reel 24 in response to advancement of an unexposed portion of the paper strip 22 in front of the tube 20. The operation is thereupon repeated to make a second copy of the diapositive 2, or the illustrated diapositive is replaced with a different original.

The amounts of copying light which are determined by the amplifier stage 18 and by the gamma adjustment unit 19, in dependency on the intensity of radiation, are selected in such a way that they invariably ensure that the low-density and preferably also the medium-density portions of the original 2 are imaged with a beam of lesser intensity and hence lesser width. This ensures that low- and medium-density regions of the copy, which are important for a subjective evaluation, are reproduced with a narrow beam, i.e., with a high degree of resolution.

The tube 20 can be replaced with a laser or with another suitable source of radiation which furnishes a beam having an approximately Gaussian intensity distribution, namely a beam which is essentially rotationally symmetrical and whose intensity decreases substantially uniformly to all sides from a maximum at the central longitudinal axis of the beam.

An advantage of the improved method and apparatus is that the low- and medium-density portions of the image on the negative photographic material 22 are formed with a narrow beam, i.e., with a low-intensity beam. This ensures a highly satisfactory resolution in such important portions of the image. On the other hand, less satisfactory resolution in high-density portions of the image is of no consequence because such high-density portions contribute little to the impression which is created by the image. Another advantage of the improved method and apparatus is that highly satisfactory copies of diapositives can be obtained with relatively small additional expenditures for electronic components irrespective of whether the image on the negative material is formed line-by-line or point-by-point.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of making a copy of an original, particularly a positive copy of a diapositive, comprising the steps of photoelectrically scanning the original, line-by-line, to obtain density signals; electronically inverting the density signals; directing a beam of radiation against a negative photosensitive material; and influencing the beam by the inverted density signals.

2. The method of claim 1, wherein said directing step includes exposing the negative material to radiation line-by-line.

3. The method of claim 1, wherein said directing step comprises exposing the negative material to radiation point-by-point.

4. The method of claim 1, wherein said beam is generated by a cathode ray tube.

5. The method of claim 1, wherein said beam is a laser beam.

6. The method of claim 1, further comprising the step of storing at least some of said density signals prior to said influencing step.

7. The method of claim 6, wherein said storing step precedes said inverting step.

8. The method of claim 1, further comprising the step of modifying the inverted signals prior to said influencing step so as to prevent pronounced widening of the beam in response to inverted signals which are generated as a result of scanning low- and medium-density portions of the original.

9. The method of claim 8, wherein said influencing step includes selecting the intensity of the beam and the duration of exposure of negative material to the beam.

10. Apparatus for making a copy of an original, particularly a copy of a diapositive on negative photosensitive material, comprising means for photoelectrically scanning the original, line-by-line, to obtain density signals; means for electronically inverting said density signals; means for directing a beam of radiation upon negative photosensitive material; and means for influencing the beam in accordance with the characteristics of inverted signals.

11. The apparatus of claim 10, wherein said directing means comprises a cathode ray tube.

12. The apparatus of claim 10, wherein said directing means comprises a laser.

13. The apparatus of claim 10, wherein said directing means comprises means for emitting a beam with a profile whose intensity decreases outwardly from the center.

14. The apparatus of claim 13, wherein said directing means comprises means for emitting a beam having an approximately Gaussian intensity distribution.

15. The apparatus of claim 10, wherein said directing means includes means for emitting a light beam containing light in the basic colors red, green and blue, and further comprising mobile red, green and blue color filters and means for moving said filters seriatim across the path of the beam between said light emitting means and the negative material.

16. A method of making a copy of an original having a first region of a first density and a second region of a lower second density, said method comprising the steps of scanning said original to obtain a first density signal for said first region and a second density signal for said second region; inverting said density signals; directing a beam of radiation against a photosensitive material; and controlling the width of said beam by the inverted density signals so that the inverted second density signal results results in a smaller beam width than does the inverted first density signal.

17. Apparatus for making a copy of an original having a first region of a first density and a second region of a lower second density, said apparatus comprising means for scanning the original to obtain a first density signal for the first region and a second density signal for the second region; means for inverting the density signals; means for directing a beam of radiation upon photosensitive material; and means for controlling the width of the beam by the inverted density signals so that the inverted second density signal results in a smaller beam width than does the inverted first density signal.

* * * * *

REEXAMINATION CERTIFICATE (4152nd)

United States Patent
[19]

Wagensonner

[11] B1 4,729,015

[45] Certificate Issued Sep. 12, 2000

[54] METHOD AND APPARATUS FOR MAKING POSITIVE COPIES FROM DIAPOSITIVES

[75] Inventor: Eduard Wagensonner, Aschheim, Germany

[73] Assignee: Agfa-Gevaert Aktiengesellschaft, Leverkusen, Germany

Reexamination Requests:
No. 90/004,013, Oct. 26, 1995
No. 90/004,056, Dec. 12, 1995

Reexamination Certificate for:
Patent No.: 4,729,015
Issued: Mar. 1, 1988
Appl. No.: 06/883,624
Filed: Jul. 9, 1986

[30] Foreign Application Priority Data

Jul. 19, 1985 [DE] Germany .............................. 35 25 807

[51] Int. Cl.[7] .................................................. H04N 1/46
[52] U.S. Cl. ............................................. 358/527; 348/104
[58] Field of Search .................................. 358/501, 527, 358/505, 506; 348/96, 99, 100, 101, 104, 108, 109, 110

[56] References Cited

U.S. PATENT DOCUMENTS

| | | |
|---|---|---|
| 1,717,781 | 6/1929 | Ives . |
| 2,453,905 | 11/1948 | Grib . |
| 4,349,835 | 9/1982 | Horiguchi et al. .................. 358/76 |
| 4,393,398 | 7/1983 | Horiguchi et al. .................. 358/76 |
| 4,626,903 | 12/1986 | Giesche et al. .................... 358/80 |

FOREIGN PATENT DOCUMENTS 1251797 10/1971 United Kingdom .

OTHER PUBLICATIONS

*The Reproduction of Colour in Photography, Printing & Television*, Fountain Press, 4th edition 1987 (3rd ed. 1875, 2nd ed. 1967, and 1st ed. 1957), Dr. R.W.G. Hunt.

*Thomas Electronics—CRT Development For Experimental Dry Silver Color Paper*, Report #1: For the Period Jan. 1, 1985–Apr. 30, 1985 Honeywell P.O. #21864 (13 pgs.).

*Primary Examiner*—Thomas D. Lee

[57] ABSTRACT

Diapositives are copied on negative photosensitive paper in an apparatus wherein the positive is electronically scanned, line-by-line, and the thus obtained density signals are electronically inverted prior to influencing the beam of a CRT or laser which is used to reproduce the image of the positive on paper, either line-by-line or point-by-point. The inversion of signals renders it possible to scan the high-transmissivity portions of the positives with a narrow beam, i.e., with a high degree of resolution.

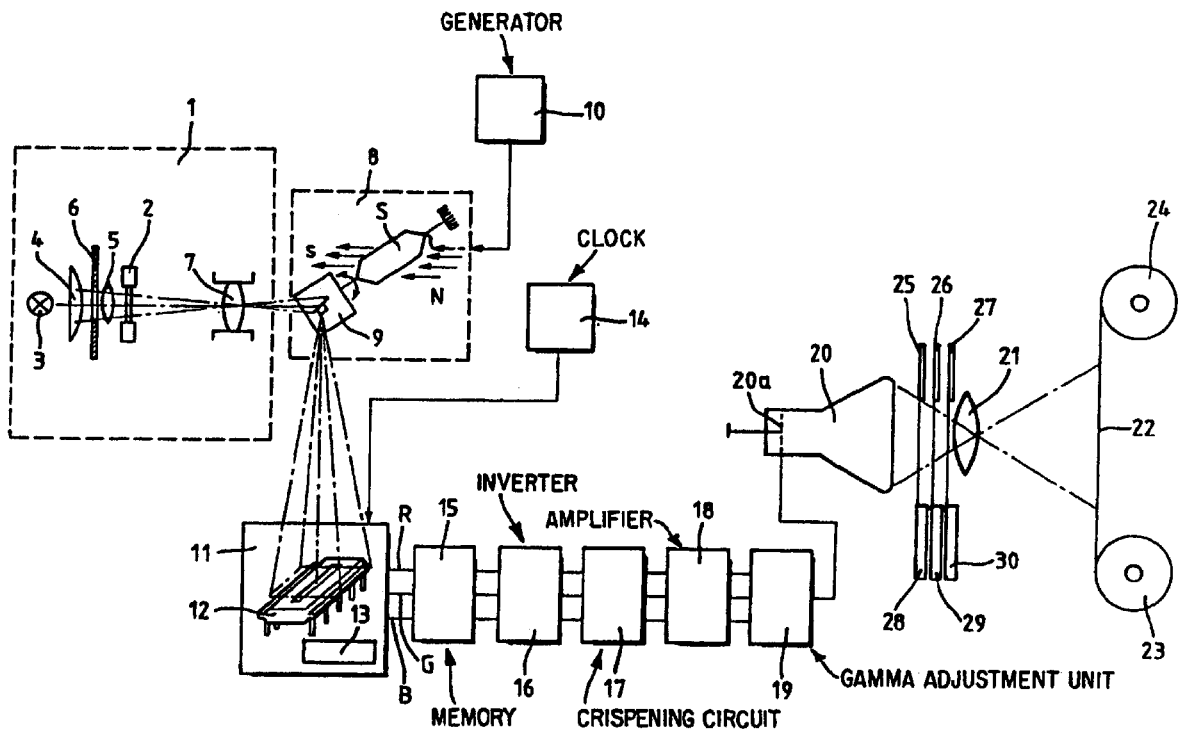

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10, 16 and 17 are determined to be patentable as amended.

Claims 2–9 and 11–15, dependent on an amended claim, are determined to be patentable.

New claims 18 and 19 are added and determined to be patentable.

1. A method of making a copy of an original, particularly a positive copy of a diapositive, comprising the steps of photoelectrically scanning the original, line-by-line, to obtain *continuously variable* density signals; electronically inverting the density signals; directing a beam of radiation against a negative photosensitive material; and influencing the beam by the inverted density signals.

10. Apparatus for making a copy of an original, particularly a copy of diapositive on negative photosensitive material, comprising means for photoelectrically scanning the original, line-by-line, to obtain *continuously variable* density signals; means for electronically inverting said density signals; means for directing a beam of radiation upon negative photosensitive material; and means for influencing the beam in accordance with the characteristics of *the* inverted signals.

16. A method of making a copy of an original having a first region of a first density and a second region of a lower second density, said method comprising the steps of scanning said original to obtain a first *continuously variable* density signal for said first region and a second *continuously variable* density signal for said second region; inverting said density signals; directing a beam of radiation against a photosensitive material; and controlling the width of said beam by the inverted density signals so that the inverted second density signal results in a smaller beam width than does the inverted first density signal.

17. Apparatus for making a copy of an original having a first region of a first density and a second region of a lower second density, said apparatus comprising means for scanning the original to obtain a first *continuously variable* density signal for the first region and a second *continuously variable* density signal for the second region; means for inverting the density signals; means for directing a beam of radiation upon photosensitive material; and means for controlling the width of the beam by the inverted density signals so that the inverted second density signal results in a smaller beam width than does the inverted first density signal.

*18. A method of making a positive copy of a positive color original, particularly a diapositive, with improved resolution comprising the steps of*

*photoelectrically scanning the original line-by-line to obtain respective continuously variable density signals representative of red, green and blue components of said original,*

*electronically inverting the density signals,*

*generating a beam of radiation by a cathode ray tube,*

*influencing the beam by the inverted density signal, and*

*directing said beam of radiation against a negative photosensitive color material through respective red, green and blue color filters coordinated with said density signals of said red, green and blue components to produce a positive copy of said original.*

*19. A method as in claim 18, further comprising*

*storing at least some of said density signals prior to said influencing step.*

* * * * *